US008826399B2

(12) United States Patent  (10) Patent No.: US 8,826,399 B2
Dorso et al.  (45) Date of Patent: Sep. 2, 2014

(54) SYSTEMS AND METHODS FOR FAST AUTHENTICATION WITH A MOBILE DEVICE

(71) Applicants: Gregory Dorso, San Jose, CA (US); Rachad Alao, Montreal (CA)

(72) Inventors: Gregory Dorso, San Jose, CA (US); Rachad Alao, Montreal (CA)

( * ) Notice: Subject to any disclaimer, the term of this patent is extended or adjusted under 35 U.S.C. 154(b) by 103 days.

(21) Appl. No.: 13/689,991

(22) Filed: Nov. 30, 2012

(65) Prior Publication Data

US 2013/0145446 A1   Jun. 6, 2013

Related U.S. Application Data

(60) Provisional application No. 61/567,120, filed on Dec. 6, 2011.

(51) Int. Cl.
*G06F 7/00* (2006.01)
*G06F 21/36* (2013.01)
*G06F 21/43* (2013.01)

(52) U.S. Cl.
CPC ............. *G06F 21/36* (2013.01); *G06F 21/43* (2013.01)
USPC ............... 726/6; 726/3; 726/4; 726/7; 726/9; 713/155; 709/228

(58) Field of Classification Search
USPC ................. 726/3.4, 6, 7, 9; 713/155; 709/228
See application file for complete search history.

(56) References Cited

U.S. PATENT DOCUMENTS

| 5,943,422 A | 8/1999 | Van Wie et al. |
| 7,387,250 B2 | 6/2008 | Muni |
| 7,774,283 B2 | 8/2010 | Das et al. |
| 8,627,438 B1 * | 1/2014 | Bhimanaik ............... 726/9 |
| 2007/0194123 A1 | 8/2007 | Frantz et al. |
| 2008/0222048 A1 | 9/2008 | Higgins et al. |
| 2008/0229098 A1 | 9/2008 | Ishak |
| 2009/0112768 A1 | 4/2009 | Hammad et al. |
| 2010/0115588 A1 * | 5/2010 | Johannesson et al. ...... 726/4 |
| 2010/0275010 A1 * | 10/2010 | Ghirardi ................. 713/155 |
| 2010/0313252 A1 | 12/2010 | Trouw |

(Continued)

FOREIGN PATENT DOCUMENTS

WO    WO 2008/018766    2/2008

OTHER PUBLICATIONS

International Search Report for International Application No. PCT/US2012/067204, mailed Mar. 28, 2013, 3 pages.

(Continued)

*Primary Examiner* — Beemnet Dada
*Assistant Examiner* — Sayed Beheshti Shirazi
(74) *Attorney, Agent, or Firm* — Nixon Peabody LLP

(57) ABSTRACT

A system for authenticating a user to a service includes a service, an authentication server and a device. The service includes first signal interface, first processing hardware and first user interface. The authentication server includes second signal interface and second processing hardware. First signal interface transmits a request to the authentication server to authenticate a user. Second processing hardware creates a session identifier and encodes it into a pictogram. Second signal interface transmits the pictogram to the service. The device includes third processing hardware that scans the pictogram and extracts the session identifier, and a third signal interface that transmits the credentials and the session identifier to the authentication server. Second processing hardware verifies the credentials, and second signal interface securely transmits the result of the authentication to the service.

25 Claims, 4 Drawing Sheets

(56) References Cited

U.S. PATENT DOCUMENTS

| | | | |
|---|---|---|---|
| 2011/0030043 A1* | 2/2011 | Jones et al. | 726/7 |
| 2011/0078081 A1 | 3/2011 | Pirzadeh et al. | |
| 2011/0161506 A1* | 6/2011 | Dickerson | 709/228 |
| 2011/0219427 A1* | 9/2011 | Hito et al. | 726/3 |
| 2013/0054320 A1 | 2/2013 | Dorso et al. | |
| 2013/0205380 A1* | 8/2013 | Avni et al. | 726/7 |

OTHER PUBLICATIONS

Written Opinion for International Application No. PCT/US2012/067204, mailed Mar. 28, 2013, 4 pages.

International Search Report for International Application No. PCT/US2012/048778, mailed Oct. 4, 2012, 2 pages.

Written Opinion for International Application No. PCT/US2012/048778, mailed Oct. 4, 2012, 3 pages.

* cited by examiner

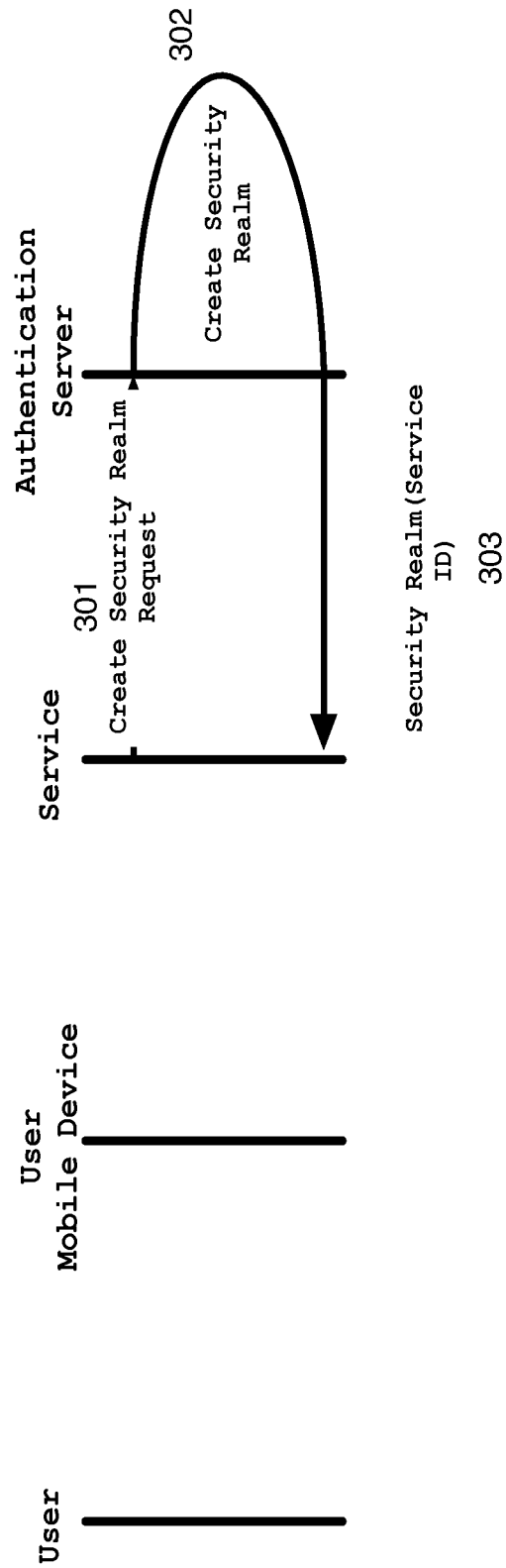

SYSTEMS AND METHODS FOR FAST AUTHENTICATION WITH A MOBILE DEVICE

CROSS REFERENCE TO RELATED APPLICATIONS

This application claims the benefit of, and priority to, U.S. Provisional Patent Application Ser. No. 61/567,120, filed Dec. 6, 2011, entitled "Methods and Apparatus for Fast Authentication with a Mobile Device," the contents of which are incorporated entirely herein by reference.

FIELD OF THE INVENTION

The present invention relates to an electronic device authentication and, more particularly but not exclusively, to authenticating a user using a mobile device.

BACKGROUND OF THE INVENTION

With the growth of e-commerce and mobile devices, several different approaches for secure authentication have been deployed. There is a need for authentication solutions that are fast and effective. The authentication solution needs to be simple from the user perspective while being impervious to any possible types of attacks. Accordingly, a solution which does not require manually entering the authentication credentials—e.g., username and password—each time a user is authenticated is needed. Systems that require a user to manually enter his or her credentials every time the user is authenticated have suffered from and are increasingly prone to attacks by software and unscrupulous users and servers that record keystrokes or monitor the temperature of keys on a keypad. Such attacks often lead to user's secure data being compromised. Furthermore, an authentication solution that does not require a user to manually enter his or her credentials into a service or machine directly is desirable to allow user authentication on public devices without having to enter credentials on an un-trusted device. The authentication solution must work with existing, deployed hardware without the need to introduce and install additional hardware, which can be expensive.

SUMMARY OF THE INVENTION

In accordance with one aspect of the present invention, a system for creating a set of user credentials to authenticate a user to a service includes a service, an authentication server and a device. The service includes a first signal interface, a first processing hardware and a first user interface. The authentication server is coupled to the service. The authentication server includes a second signal interface and a second processing hardware. The first signal interface is configured to transmit a request to the authentication server to provision a set of credentials. The request includes a security realm identifying the service. The second processing hardware is configured to create a session identifier and to encode the session identifier into a pictogram. The second signal interface is configured to transmit the pictogram to the service. The device includes a third signal interface and a third processing hardware. The first user interface is configured to display the pictogram. The third processing hardware is configured to scan the pictogram. The third signal interface is configured to securely transmit a signal associated with the pictogram to the authentication server. The second processing hardware is configured to locate the security realm and to create a set of credentials associated with the device. The second signal interface is configured to securely transmit the set of credentials to the device for authentication with the service.

According to a further aspect of the present invention, a system for authenticating a user to a service includes a service, an authentication server and a device. The service includes first processing hardware and a first signal interface configured to transmit a pre-configured security realm to the authentication server. The authentication server includes second processing hardware configured to generate a session identifier associated with the security realm. The second processing hardware is further configured to encode the session identifier and the security realm into a pictogram. The authentication server also includes a second signal interface configured to transmit the pictogram to the service. The service includes a user interface configured to display the pictogram. The device is configured to scan the pictogram and to retrieve the session identifier associated with the pictogram. The device includes a third signal interface configured to transmit the session identifier to the authentication server. The second processing hardware associated with the authentication server is further configured to locate the security realm associated with the session identifier. The second signal interface is configured to transmit the security realm to the device. The third processing hardware associated with the device is configured to review the security realm to determine an identity of the service requesting authentication and to choose a set of credentials corresponding to the service. The third signal interface associated with the device is configured to send the credentials securely to the authentication server. The second processing hardware associated with the authentication server is configured to match the credentials received from the device with its own credential storage system, and if the credentials match, the second signal interface is configured to transmit an authentication acknowledgement of the user to the service.

According to yet another aspect of the present invention, a method for creating a set of user credentials to authenticate a user to a service includes transmitting, by a first user interface associated with a service, a request to provision a set of credentials to an authentication server. The request includes an identifier associated with the service. The second processing hardware associated with an authentication server creates a session identifier associated with the service. The second processing hardware encodes the session identifier into a pictogram. A second signal interface associated with the authentication server transmits the pictogram and the session identifier to the service. A first user interface associated with the service displays the pictogram. A third processing hardware associated with a device scans the pictogram. A third signal interface securely transmits a signal associated with the pictogram to the authentication server. The second processing hardware locates the security realm and creates a set of credentials associated with the device. The second signal interface securely transmits the set of credentials to the device for authentication with the service.

According to yet another aspect of the present invention, a method for authenticating a user to a service includes transmitting, by a first signal interface associated with a service, a pre-configured security realm to an authentication server. Second processing hardware associated with an authentication server generates a session identifier associated with the security realm. The second processing hardware encodes session identifier and security realm into a pictogram. The second signal interface associated with the authentication server transmits the session identifier and pictogram to the service. The user interface associated with the service displays the pictogram. A device scans the pictogram and retrieves the session identifier and the security realm associated with the pictogram. A third processing hardware associated with the device determines an identity of the service requesting authentication and chooses a set of credentials corresponding to the service. The third signal interface transmits the credentials and the session identifier to the authentication server. The second processing hardware matches the credentials received from the device with its own credential storage system and transmits an authentication acknowledgement to the service if the credentials match.

According to yet another aspect of the present invention, a system for creating a set of user credentials to authenticate a user to a service includes an authentication server, the service and a device. The authentication server includes first processing hardware configured to generate a session identifier associated with the service. The first processing hardware is further configured to encode the session identifier into a pictogram. The authentication server also includes a first signal interface configured to transmit the pictogram and the session identifier to the service. The service is coupled to the authentication server. The service includes a user interface configured to display the pictogram. The device includes second processing hardware configured to scan the pictogram and retrieve the session identifier associated with the pictogram. The second processing hardware is configured to retrieve a set of credentials for authentication with the service. The device further includes a second signal interface configured to transmit the set of credentials to the authentication server for validation.

According to another aspect of the present invention, a system for creating a set of user credentials to authenticate a user to a service includes a device, an authentication server and the service. The authentication server includes a first processing hardware configured to generate a session identifier. The first processing hardware is further configured to encode the session identifier into a pictogram. The authentication server also includes a first signal interface configured to transmit the pictogram and the session identifier to the service. The service includes a user interface configured to display the pictogram. A device includes second processing hardware configured to scan the pictogram and to retrieve the session identifier associated with the pictogram. The device also includes a second signal interface configured to transmit the session identifier to the authentication server. The first processing hardware is further configured to create a set of credentials corresponding to the session identifier on behalf of the device and to transmit the set of credentials to the device.

BRIEF DESCRIPTION OF THE DRAWINGS

The foregoing and other advantages of the present disclosure will become apparent upon reading the following detailed description and upon reference to the drawings.

FIG. 3a is a sequence diagram illustrating how the security realm is created;

Figure 1:
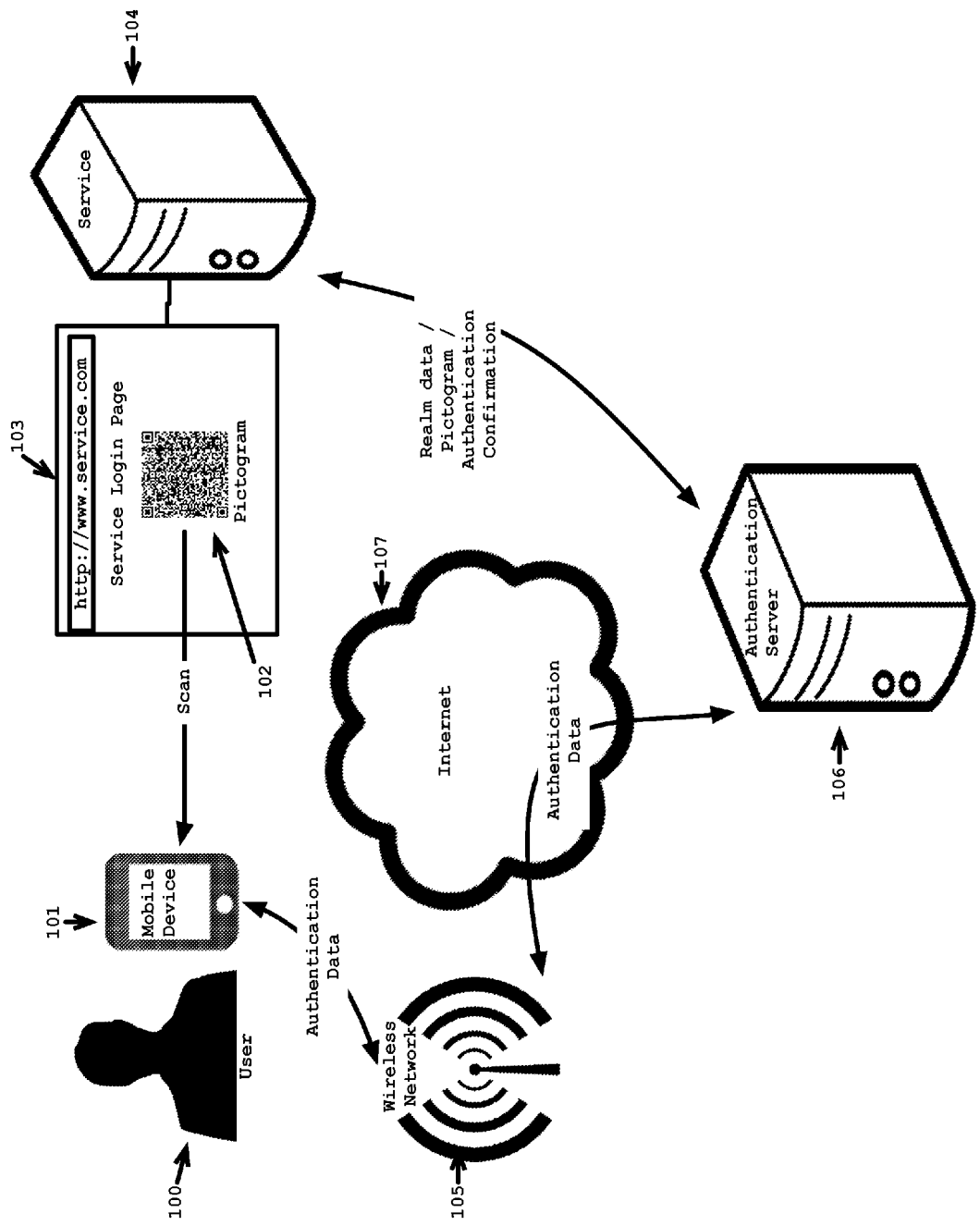
FIG. 1 a block diagram illustrating a system for fast authentication.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF ILLUSTRATED EMBODIMENTS

In the following description, for purposes of explanation and not limitation, specific details are set forth, such as particular embodiments, procedures, techniques, etc. in order to provide a thorough understanding of the present invention. However, it will be apparent to those ordinarily skilled in the art that the present invention may be practiced in other embodiments that depart from these specific details.

The following discussion is intended to provide a brief, general description of suitable computer processing environments in which the methods and apparatus described herein may be implemented. In one non-limiting example, the method and apparatus will be described in the general context of processor-executable instructions, such as program modules, being executed in a distributed computing environment in which tasks may be performed by remote and local processing devices linked via one or more networks. Those of ordinary skill in the art will appreciate that the method may be practiced with any number of suitable computer system configurations and is not limited to the described configurations.

Referring now to FIG. 1, a pictogram 102, such as a generated picture, a suite of symbols, a 1-D Barcode (UPC, EAN, GS1, JAN, etc.), a 2-D barcode (QR Code, EZ Code, Data Matrix, etc.), created by an authentication server 106 and associated with a particular service 104 is rendered on a screen or displayed or printed on a piece of paper. It should be understood that any suitable means of generating and displaying the pictogram 102 is covered under this description. The pictogram 102 is scanned by a user 100 using a device 101 capable of scanning a pictogram 102 (referred to as "device" herein). The device 101 includes a mobile device, including a smartphone, a personal digital assistant, a tablet, a portable game console, a computer, or any device having scanning capabilities. The user 100 and/or the device 101 details are retrieved from the device 101 based on the information embedded into the scanned pictogram 102. The retrieved user and/or device details are utilized to automatically authenticate the user 100 and/or the device 101 with the service 104.

According to a further aspect of the present invention, a user or customer 100 has a device 101 that can capture environmental stimuli (e.g., pictures, sounds, vibrations, etc.). The user 100 captures a specifically created stimulus (image, sound, etc.) with his or her device 101 to retrieve details or predetermined characteristics associated with the stimulus. The stimulus may be produced and the authentication may be processed as described in U.S. patent application Ser. No. 13/561,244, filed Jul. 30, 2012, the contents of which are incorporated by reference herein in their entirety.

This authentication mechanism can be implemented on Automatic Teller Machines (ATM), on secure websites, for Point Of Sale (POS), where the POS offers multiple payment options by displaying all these payment options (VISA, MC, AMEX, PayPal, mile transfer, reward points, etc.) along with a specific pictogram 102 for each of the payment options to the user 100. The authentication mechanism according to the present invention may be used for law enforcement (for example, for identification of a driver during a traffic stop), administration, access to public services (e.g., access to libraries and other public resources), merchants (e.g., the authentication mechanism may allow the device 101 to be used as a virtual credit card), and a wide variety of other applications. The user 100 scans the particular pictogram 102 that the user 100 wants to use for authentication, and the payment is effectively processed in the backend. The authentication mechanism can be used anywhere (e.g., stores, fidelity programs, etc.), with any service 104 that has a user interface that can display the pictogram 102 (TV, projector, POS, mobile device, computer, etc.) and by using any device 101 that includes processing hardware that has the capability to scan the pictogram 102.

Certain aspects of the present invention are directed to systems and methods to quickly, safely and efficiently authenticate a user to a third party using a camera and a scanning enabled device 101.

Figure 2:
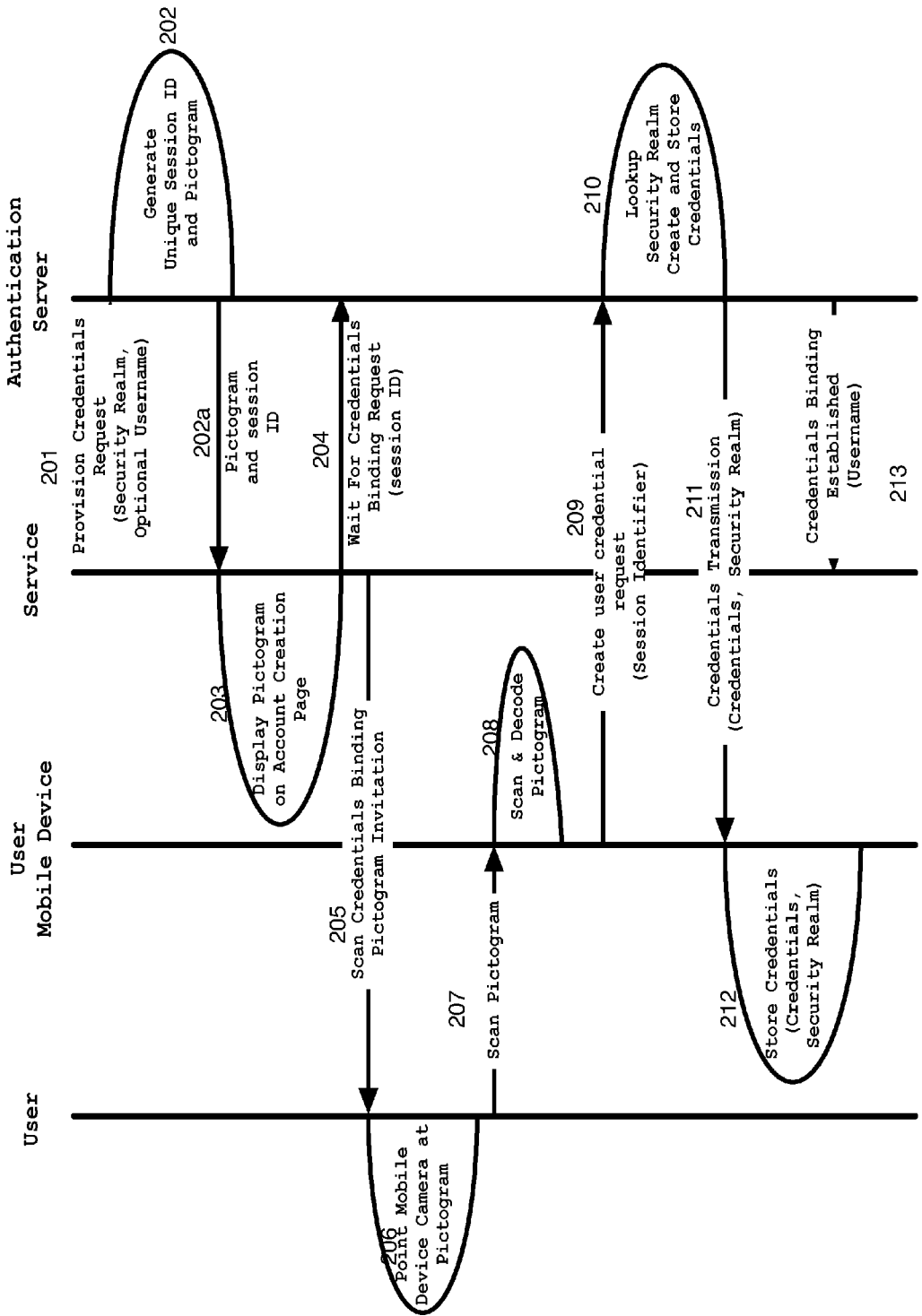
FIG. 2 is sequence diagram illustrating how a user's credentials are created.

Referring now to FIG. 2, the "Account Creation" phase begins with the service 104 transmitting a request to the authentication server 106 to provision a new set of credentials in step 201. In step 201, the service 104 also passes a security realm to identify the service 104. The notion of a security realm is used to identify the particular service 104. Within a walled garden environment or ecosystem, the security realm may be unnecessary since it is assumed to be the one and only same security realm. In such a system, the service 104 and the authentication server 106 are generally managed by the same entity.

The authentication server 106 creates a unique session identifier in step 202 and associates it with the Security Realm.

The authentication server 106 then creates the pictogram 102 that encodes the session identifier (possibly as a secure URL) and sends it back to the Service 104.

The service 104 displays the pictogram 102 via the user interface (e.g., a display) on the account creation page in step 203. The service 104 then waits in step 204 for the authentication server 106 to confirm that the credential binding has happened with the device 101. The service 104 invites the user 100 to scan the pictogram 102 in step 205.

The user 100 points the mobile device 101 (or the camera of the mobile device 101) at the pictogram 102 and scans the pictogram 102 in step 206. The mobile device 101 scans the pictogram 102 in step 207. The mobile device 101 decodes the pictogram 102 in step 208. The mobile device 101 retrieves the session identifier from the pictogram 102 and transmits it to the authentication server 106 through an IP network (possibly as a single secure URL) in step 209. According to a further aspect of the present invention, the pictogram 102 is sent to the authentication server 106 for decoding as an alternative embodiment, in this case, the authentication server 106 is coupled to or includes processing hardware configured to decode the pictogram 102. According to a further aspect of the present invention, the device 101 transmits the pictogram 102 to a third party server, not associated with the authentication server 106, for decoding. The third party server decodes the pictogram 102.

The authentication server 106 receives the session identifier, locates the security realm and creates credentials (e.g., Username if required, Password) in step 210. Optionally, the credentials are stored in a database. The credentials may be returned along with the security realm to the device 101 in step 211. In another embodiment, the authentication server 106 stores half of the encrypted password in its database and the other half on the user device 101. This storage diversity scheme further decreases the risk of a security breach. Alternatively, the client can generate its own credentials.

The device 101 stores the credentials in its local storage in step 212.

The authentication server 106 unblocks the service 104 by confirming that the credentials have been established in step 213.

In existing password-based schemes, a "forgotten password" can be reset by requesting the service 104 to send an email with a URL. In this case, the email can contain a re-provisioning pictogram 102. The mobile device 101 transmits a request message to the service 104 requesting the password. The service 104 transmits the email or another communication to the mobile device 101 with a re-provisioning pictogram 102.

According to one embodiment, in step 207, the customer 100 presses an appropriate prompt on the screen of the device 101 in order for the device 101 to scan the pictogram 102. In step 208, the device 101 performs the actual scanning and capturing of the pictogram 102. According to one embodiment, the device 101 improves the pictogram capture process by checking potential calibration marks in the pictogram 102. According to another embodiment, the device 101 continuously scans the pictogram 102 until a scan of a suitable quality or resolution is captured.

The mobile device 101 decodes the pictogram 102 and retrieves the session identifier in step 210. The particular algorithm used to decode the pictogram 102 depends largely on the type of pictogram that is used. Different type of pictograms include a generated Picture, a suite of symbols, a 1-D Barcode (UPC, EAN, GS1, JAN, etc), a 2-D barcode (QR Code, EZ Code, Data Matrix, etc.), a coded image (steganography or watermarking), etc. According to one aspect of the present invention, the pictogram 102 is embedded into a picture. The picture appears to be a regular picture to a human (naked) eye. In other words, the embedded pictogram is not easily detected by a human eye. According to one aspect of the present invention, the pictogram 102 includes a suite of symbols. Such a pictogram is generally decoded using optical character recognition (OCR) and similar algorithms to digitize the symbols. A decryption algorithm may also be used to retrieve the information following OCR. According to a further aspect of the present invention, the pictogram 102 may be a quick response code (QR code) based pictogram. A QR code pictogram 102 may be decoded by first performing a picture calibration phase using calibration markers. Then, 2D dot decoding (optionally, with error correcting code (ECC) is performed. Finally, a decryption algorithm may be used to retrieve the information from the pictogram 102 following the calibration phase and the 2D dot decoding phase.

The appropriate hardware or software decoding algorithm is used for decoding the pictogram based on its specific type.

According to a further aspect of the present invention, the pictogram 102 embeds information within itself to retrieve the full details of the session from the session server. The pictogram may be decoded to a uniform resource locator (URL).

According to one embodiment, the interaction with the application can be secured using an authentication mechanism such as passwords, biometrics, security codes or questions, etc. to unlock the user interface and/or to decrypt the actual credentials that are used to authenticate with the authentication server 106.

The user credentials are not available to any untrusted paths at any point during the transaction: they only travel within trusted backend systems and through secure connections.

Referring now to FIG. 3a, at initialization of the service 104, a security realm request is created and transmitted to the authentication server 106 in step 301. The authentication server 106 creates a security realm (an identifier for the service 104) in step 302. The authentication server 106 transmits the security realm to the service 104 in step 303. The service 104 stores the security realm for future uses with the authentication server 106.

Figure 3B:
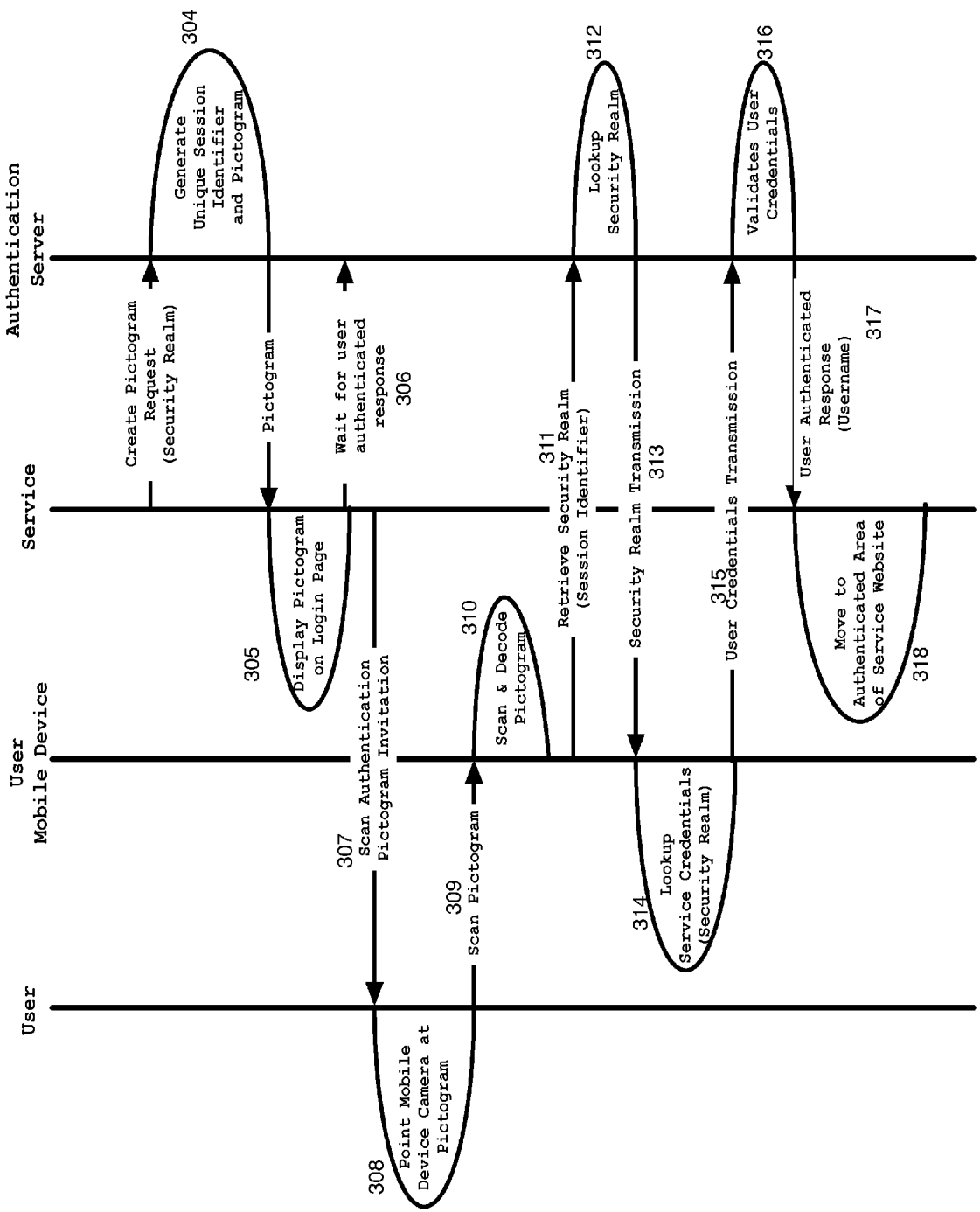
FIG. 3b is a sequence diagram illustrating a method to authenticate a user using a mobile device and a pictogram.

In FIG. 3b, to create the pictogram 102, the authentication server 106 generates a unique session identifier, associates it with the security realm, and then generates a pictogram 102 that encodes the session identifier (for example in the form of a URL) in step 304. The authentication server 106 transmits the pictogram 102 to the service 104, then transitions into a "wait for an authenticated user 100" state.

The service 104 now has a pictogram 102 that it displays in step 305 (for example, on the welcome/login page 103 of FIG. 1) to the user 100. It then waits for the user authenticated response in step 306.

The service 104 transmits an invitation to the user 100 to scan the pictogram 102 with the device 101 in step 307.

The user 100 points the device 101 at the pictogram 102 in step 308, and the device 101 scans the pictogram 102 in step 309. The processing hardware associated with the device 101 decodes the pictogram 102 in step 310. Decoding the pictogram 102 in turn decodes the unique identifier (for example, a URL). The device 101 then uses the internet protocol (IP) connectivity to securely contact (e.g., using an HTTPS connection or other secure connection) the authentication server 106, and then submits the session identifier in step 311 (possibly as part of the URL). According to a further aspect of the present invention, the device 101 does not itself carry out the decoding but instead sends the pictogram 102 to be decoded by the authentication server 106.

The authentication server 106 uses the session identifier to locate the associated security realm in step 312. The authentication server 106 transmits the security realm to the device 101 in step 313. According to a further aspect of the present invention, the security realm is embedded in the session identifier retrieved by decoding the pictogram 102 in step 310, in this case, steps 311, 312 and 313 are skipped.

The device 101 inspects the security realm to determine which service 104 is requesting authentication, and picks the corresponding credentials (e.g., username, password) from its secure key ring (e.g., encrypted list of username, password pair) in step 314. Alternatively, as described above, encrypted half passwords can be used if the storage diversity is implemented.

The device 101 then securely transmits the corresponding credentials to the authentication server in step 315. These credentials are transmitted using a secure connection (e.g., via HTTPS).

The authentication server 106 validates the credentials received from the device 101 in step 316. If applicable, the authentication server 106 transmits, in step 317, a response including a username corresponding to the user 100 to the service 104 indicating that the user 100 has been authenticated, thereby unblocking the service 104.

The service 104 can now proceed to the authenticated area in step 318 of the user interface ("logged-in state").

According to a further aspect of the present invention, the authentication phase between the device 101 and the authentication server 106 uses a challenge-based protocol, exemplified by, but not limited to, challenge-handshake authentication protocol (CHAP).

The device 101 also needs to authenticate the server (e.g., using cryptographic methods such as certificates used in SSL/TLS handshaking) since a rogue authorization server could be behind the URL used by the device 101.

According to a further aspect of the present invention, the authentication server 106 becomes a proxy for the user's key ring. In this case, the user 100 just needs to store one and only one set of credentials to authenticate with the authentication server 106. The authentication server 106 then retrieves the appropriate credentials (based on the security realm) on behalf of the user 100.

According to a further aspect of the present invention, the authentication server 106 merely brokers the communication between the device 101 and the service 104, and does not actually store the credentials. The authentication is completed by the service 104, via the authentication server 106.

If a user wants to transfer credentials (full transfer, or duplicate) from one device to another device, the user can request the authentication server 106 for a transfer pictogram 102. In this case, the original device 101 acts as "a service 104" and displays the pictogram 102 for the destination device 101 to scan. The authentication server 106 can then perform the provisioning of the second device and link the credentials of the two devices together (optionally deleting the credentials of the first device in case of a full transfer).

This scheme is most effective when the authentication server 106 acts as a user 100 key ring: in this case, any new credential becomes available on all devices immediately without needing to synchronize devices manually.

Although aspects of the present invention described above describe a credential creation process and an authentication process that involve the use of a device 101, wherein the device 101 is a mobile device, it is contemplated that the device 101 may also be a personal computer. The pictogram 102 is displayed on a user interface associated with the service 104. This user interface may be a particular display element of the personal computer 101 user interface, such as a browser window. A user 100 may interact with the pictogram 102 in order to trigger processing software on the personal computer to perform the pictogram scanning. According to a further aspect of the present invention, the processing hardware is configured to automatically locate and scan the pictogram 102 without interaction from the user 100.

The present invention includes systems having processors to provide various functionality to process information, and to determine results based on inputs. Generally, the processing may be achieved with a combination of hardware and software elements. The hardware aspects may include combinations of operatively coupled hardware components including microprocessors, logical circuitry, communication/networking ports, digital filters, memory, or logical circuitry. The processors may be adapted to perform operations specified by a computer-executable code, which may be stored on a computer readable medium.

The steps of the methods described herein may be achieved via an appropriate programmable processing device, such as an external conventional computer or an on-board field programmable gate array (FPGA) or digital signal processor (DSP), that executes software, or stored instructions. In general, physical processors and/or machines employed by embodiments of the present invention for any processing or evaluation may include one or more networked or non-networked general purpose computer systems, microprocessors, field programmable gate arrays (FPGAs), digital signal processors (DSPs), micro-controllers, and the like, programmed according to the teachings of the exemplary embodiments of the present invention, as is appreciated by those skilled in the computer and software arts. Appropriate software can be readily prepared by programmers of ordinary skill based on the teachings of the exemplary embodiments, as is appreciated by those skilled in the software arts. In addition, the devices and subsystems of the exemplary embodiments can be implemented by the preparation of application-specific integrated circuits or by interconnecting an appropriate network of conventional component circuits, as is appreciated by those skilled in the electrical arts. Thus, the exemplary embodiments are not limited to any specific combination of hardware circuitry and/or software.

Stored on any one or on a combination of computer readable media, the exemplary embodiments of the present invention may include software for controlling the devices and subsystems of the exemplary embodiments, for driving the devices and subsystems of the exemplary embodiments, for processing data and signals, for enabling the devices and subsystems of the exemplary embodiments to interact with a human user, and the like. Such software can include, but is not limited to, device drivers, firmware, operating systems, development tools, applications software, and the like. Such computer readable media further can include the computer program product of an embodiment of the present invention for performing all or a portion (if processing is distributed) of the processing performed in implementations. Computer code devices of the exemplary embodiments of the present invention can include any suitable interpretable or executable code mechanism, including but not limited to scripts, interpretable programs, dynamic link libraries (DLLs), Java classes and applets, complete executable programs, and the like. Moreover, parts of the processing of the exemplary embodiments of the present invention can be distributed for better performance, reliability, cost, and the like.

Common forms of computer-readable media may include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

The invention claimed is:

1. A system for creating a set of user credentials to authenticate a user to a service, comprising:
   the service including a first signal interface, a first processing hardware and a first user interface;
   an authentication server coupled to the service, the authentication server including a second signal interface and a second processing hardware, wherein the first signal interface is configured to transmit a request to the authentication server to provision a set of credentials, the request including a security realm identifying the service, wherein the second processing hardware is configured to create a session identifier and to encode the session identifier into a pictogram and wherein the second signal interface is configured to transmit the pictogram to the service; and
   a device including a third signal interface and a third processing hardware,
   wherein the first user interface is configured to display the pictogram,
   wherein the third processing hardware is configured to scan the pictogram and the third signal interface is configured to securely transmit a signal associated with the pictogram to the authentication server, wherein the second processing hardware is configured to locate the security realm and to create a set of credentials associated with the device, the second signal interface being configured to securely transmit the set of credentials to the device for authentication with the service;
   wherein the third signal interface associated with the device is configured to transmit a request to the authentication server for a transfer pictogram, wherein the second signal interface associated with the authentication server is configured to return the transfer pictogram to the device, the device including a device user interface configured to display the transfer pictogram, wherein the transfer pictogram is scanned by a second device to transfer the set of credentials from the device to the second device.

2. The system of claim 1, wherein the first signal interface associated with the service is configured to transmit a username together with the request to provision the set of credentials.

3. The system of claim 1, wherein the second signal interface is configured to transmit a username to the service after the credential creation has completed.

4. The system of claim 1, wherein the third processing hardware is configured to decode the pictogram and retrieve the session identifier, wherein the signal associated with the pictogram includes the session identifier.

5. The system of claim 1, wherein the second processing hardware is configured to decode the session identifier, wherein the signal associated with the pictogram includes the pictogram.

6. The system of claim 1, wherein the third processing hardware is configured to store the set of credentials.

7. The system of claim 1, wherein the authentication server is configured to store the set of credentials in a database or cloud coupled to the authentication server or associated with the authentication server.

8. The system of claim 1, wherein the third processing hardware is configured to store a portion of the set of credentials and wherein the second processing hardware is configured to store a remaining portion of the set of credentials to increase security.

9. The system of claim 1, wherein the device is a smartphone, a tablet, a portable game console, a computer with scanning capabilities or a personal digital assistant.

10. The system of claim 1, wherein the pictogram is a generated picture, a suite of symbols, or a barcode including a 1-D barcode and a 2-D barcode.

11. The system of claim 1, wherein the pictogram is rendered on a display or printed media.

12. The system of claim 1, wherein the service is an internet service, a secure website, a point of sale device, or an automated teller machine.

13. The system of claim 1, wherein the first user interface associated with the service is configured to transmit a request to the authentication server for a credential recovery pictogram, wherein the credential recovery pictogram is securely presented to a user of the device through a separate mechanism, wherein the credential recovery pictogram is scanned by the device to recover the set of credentials from authentication server.

14. The system of claim 13, wherein the separate mechanism includes an email attachment, an SMS-link, or another suitable method.

15. A system for authenticating a user to a service, comprising:
the service including first processing hardware and a first signal interface configured to transmit a pre-configured security realm to an authentication server;
the authentication server including second processing hardware configured to generate a session identifier associated with the security realm, the second processing hardware being further configured to encode the session identifier and the security realm into a pictogram, the authentication server also including a second signal interface configured to transmit the pictogram to the service, wherein the service includes a user interface configured to display the pictogram; and
a device configured to scan the pictogram and retrieve the session identifier associated with the pictogram, the device including a third signal interface configured to transmit the session identifier to the authentication server,
wherein the second processing hardware associated with the authentication server is further configured to locate the security realm associated with the session identifier and wherein the second signal interface is configured to transmit the security realm to the device, and
wherein the third processing hardware associated with the device is configured to review the security realm to determine an identity of the service requesting authentication and to choose a set of credentials corresponding to the service, and
wherein the third signal interface associated with the device is configured to send the credentials securely to the authentication server, and
wherein the second processing hardware associated with the authentication server is configured to match the credentials received from the device with its own credential storage system, and if the credentials match, the second signal interface is configured to transmit an authentication acknowledgement of the user to the service;
wherein the third signal interface associated with the device is configured to transmit a request to the authentication server for a transfer pictogram, wherein the second signal interface associated with the authentication server is configured to return the transfer pictogram to the device, the device including a device user interface configured to display the transfer pictogram, wherein the transfer pictogram is scanned by a second device to transfer the set of credentials from the device to the second device.

16. The system of claim 15, wherein the device is configured to decode the pictogram and retrieve the session identifier.

17. The system of claim 15, wherein the device is configured to retrieve the session identifier and security realm by transmitting the pictogram, by the third signal interface, to the service for decoding, wherein the first processing hardware decodes the session identifier and the security realm and transmits the session identifier and the security realm to the device.

18. The system of claim 15 wherein the device is configured to retrieve both the session identifier and the security realm associated with the pictogram without transmitting the pictogram, wherein the third processing hardware associated with the device reviews the security realm to determine an identity of the service requesting authentication and to choose a set of credentials corresponding to the service.

19. The system of claim 15, wherein the device is configured to retrieve the session identifier and security realm by transmitting the pictogram, by the third signal interface, to the authentication server for decoding, wherein the second processing hardware decodes the session identifier and security realm and transmits the session identifier and security realm to the device.

20. The system of claim 15, wherein the user is authenticated by the service via the authentication server, wherein the set of credentials is not stored on the authentication server.

21. The system of claim 15, wherein the device is configured to store a portion of the set of credentials and the authentication server is configured to store a remaining portion of the set of credentials, the authentication server being configured to authenticate the user through another entity by presenting the combination of the credentials.

22. The system of claim 15, wherein the authentication phase between the device and the authentication server uses a challenge based authentication protocol.

23. The system of claim 15, wherein the device is a PC and wherein the service uses a user interface element of the PC to render the pictogram wherein the PC offers a user interface element for the user to trigger the scanning of the pictogram.

24. A method for creating a set of user credentials to authenticate a user to a service, comprising:
transmitting, by a first user interface associated with the service, a request to provision a set of credentials to an authentication server, the request including an identifier associated with the service;
creating, by a second processing hardware associated with an authentication server, a session identifier associated with the service;
encoding, by the second processing hardware, the session identifier into a pictogram;
transmitting, by a second signal interface associated with the authentication server, the pictogram and the session identifier to the service;
displaying, by a first user interface associated with the service, the pictogram;
scanning, by a third processing hardware associated with a device, the pictogram;
securely transmitting, by a third signal interface, a signal associated with the pictogram to the authentication server;
locating, by the second processing hardware, the security realm;
creating, by the second processing hardware, a set of credentials associated with the device; and
securely transmitting, by the second signal interface, the set of credentials to the device for authentication with the service;
transmitting, by the third signal interface associated with the device a request to the authentication server for a transfer pictogram,
returning, by the second signal interface associated with the authentication server, the transfer pictogram to the device,
displaying, by the device including a device user interface, the transfer pictogram,
scanning, by a second device, the transfer pictogram to transfer the set of credentials from the device to the second device.

25. A method for authenticating a user to a service, comprising:
transmitting, by a first signal interface associated with the service, a pre-configured security realm to an authentication server;

generating, by a second processing hardware associated with an authentication server a session identifier associated with the security realm;

encoding, by the second processing hardware, the session identifier into a pictogram;

transmitting, by a second signal interface associated with the authentication server, the pictogram and the session identifier to the service, displaying the pictogram by a user interface associated with the service;

scanning the pictogram and retrieving the session identifier and the security realm associated with the pictogram by a device;

determining an identity of the service requesting authentication and choosing a set of credentials corresponding to the service by a third processing hardware associated with the device;

transmitting, by the third signal interface, the credentials and the session identifier to the authentication server, and matching, by the second processing hardware, the credentials received from the device with its own credential storage system and transmitting, by the second signal interface an authentication acknowledgement to the service if the credentials match;

transmitting, by the third signal interface associated with the device a request to the authentication server for a transfer pictogram, returning, by the second signal interface associated with the authentication server, the transfer pictogram to the device, displaying, by the device including a device user interface, the transfer pictogram, scanning, by a second device, the transfer pictogram to transfer the set of credentials from the device to the second device.

\* \* \* \* \*